UNITED STATES PATENT OFFICE.

HERMANN BECKMANN, OF WITTEN, GERMANY.

MANUFACTURE OF LEAD PEROXID AND ITS APPLICATION TO ELECTRICAL STORAGE BATTERIES.

SPECIFICATION forming part of Letters Patent No. 644,050, dated February 27, 1900.

Application filed December 9, 1899. Serial No. 739,778. (No specimens.)

*To all whom it may concern:*

Be it known that I, HERMANN BECKMANN, a subject of the German Emperor, residing at Witten-on-the-Ruhr, Germany, have invented a certain new and useful Improvement in the Manufacture of Lead Peroxid and its Application to Electrical Storage Batteries, (Case No. 1,) of which the following is a full, clear, concise, and exact description.

This invention relates to the production of lead peroxid and the application thereof as a durable peroxid coating for the electrode-plates of storage batteries of the Planté kind.

While the use of sulfite compounds have heretofore been considered unsuitable for the production of peroxid plates of the Planté kind, I have, on the other hand, discovered by means of experiments that, for example, the formation of lead peroxid from metallic lead by means of the electric current can be effected in the presence of free sulfurous acid in a much shorter time and in an essentially more favorable manner than is the case with the method of the Planté formation heretofore employed. The process may be carried out in such a way that, for example, metallic lead in suitable form is introduced as a positive electrode in a solution of free sulfurous acid and is then subjected to the action of an electric current.

The sulfurous-acid solution can be prepared by introducing sulfur dioxid into water or by dissolving a salt that, in conjunction with an acid, will generate sulfur dioxid in water, to which an acid is added. In the latter case sodium hyposulfite is preferably employed. By the addition of a definite small quantity of sulfuric acid this is at once partially decomposed and sulfurous anhydrid is set free. If the electric current be then introduced, a good strong peroxid coating is obtained on the positive electrode-plate.

If the introduction of the current be delayed for some time until the sulfurous acid has by oxidation been gradually converted into sulfuric acid or has escaped and the process be accelerated by stirring or blowing in air, no appreciable quantity of peroxid coating will be obtained, which proves that in this case the sulfurous acid alone causes the formation of the peroxid.

The advantage of the formation of the plates by means of the above-described invention consists, mainly, in that no substances that are detrimental to the duration of the electrodes—such as chlorin, saltpeter, &c.—are employed. It is therefore not necessary to subject the plates after termination of the formation to the discharging action or otherwise to remove any residues of the forming liquid. The plates are therefore taken directly as they come from the forming solution and are fitted into the storage vessels. Also the lengthened preliminary charging of the plates in the storage vessel is rendered unneccessary with the improved process, such a charging having heretofore been frequently necessary with Planté electrode-plates for removing any salt residues from the same.

The formation of peroxid is effected under the conditions above stated in a considerably shorter space of time than according to the existing processes. Already after thirty hours the plate is covered with a peroxid coating of such thickness as to be capable of being used as a pole-plate in a storage battery.

Having now particularly described and ascertained the nature of my invention and the manner in which the same is to be performed, I declare that what I claim is—

1. A process for producing lead peroxid particularly as a coating for the electrodes of storage batteries which consists in introducing metallic lead into a solution of free sulfurous acid as a positive electrode and subjecting it to the action of an electric current.

2. A process for producing lead peroxid particularly as a coating for the electrodes of storage batteries which consists in introducing metallic lead into a solution of a salt that in conjunction with an acid will generate sulfur dioxid adding a suitable acid and subjecting the lead as a positive electrode to the action of an electric current.

3. A process for producing lead peroxid particularly as a coating for the electrodes of storage batteries which consists in introducing metallic lead as a positive electrode into a solution of sodium hyposulfite in water, adding sulfuric acid and introducing an electric current.

In witness whereof I hereunto subscribe my name this 18 day of November, A. D. 1899.

HERMANN BECKMANN.

Witnesses:
OTTO KÖNIG,
JOHN A. RITTERSHAUS.